(12) United States Patent
Huang

(10) Patent No.: US 11,196,321 B2
(45) Date of Patent: Dec. 7, 2021

(54) CANNED MOTOR DEVICE

(71) Applicant: ZI YI ELECTRICAL ENGINEERING CO., LTD., Taichung (TW)

(72) Inventor: Ting-Tsai Huang, Taichung (TW)

(73) Assignee: ZI YI ELECTRICAL ENGINEERING CO., LTD., Taichung (TW)

( * ) Notice: Subject to any disclaimer, the term of this patent is extended or adjusted under 35 U.S.C. 154(b) by 208 days.

(21) Appl. No.: 16/713,598

(22) Filed: Dec. 13, 2019

(65) Prior Publication Data

US 2020/0204033 A1 Jun. 25, 2020

(30) Foreign Application Priority Data

Dec. 20, 2018 (TW) .................................. 107146207

(51) Int. Cl.
| | |
|---|---|
| *H02K 5/18* | (2006.01) |
| *H02K 5/02* | (2006.01) |
| *H02K 9/22* | (2006.01) |
| *H02K 37/24* | (2006.01) |

(52) U.S. Cl.
CPC ................. *H02K 5/18* (2013.01); *H02K 5/02* (2013.01); *H02K 9/22* (2013.01); *H02K 37/24* (2013.01)

(58) Field of Classification Search
CPC .. H02K 9/22; H02K 5/12; H02K 5/18; H02K 37/24
USPC ......................................... 310/52, 62, 63, 87
See application file for complete search history.

(56) References Cited

U.S. PATENT DOCUMENTS

| | | | | |
|---|---|---|---|---|
| 5,997,261 A | * | 12/1999 | Kershaw | H02K 9/19 417/366 |
| 2007/0018521 A1 | * | 1/2007 | Ishiguro | H02K 7/14 310/156.43 |
| 2007/0177993 A1 | * | 8/2007 | Nakamichi | F04D 29/047 417/354 |

(Continued)

FOREIGN PATENT DOCUMENTS

| | | | |
|---|---|---|---|
| CN | 2162030 Y | † | 4/1994 |
| CN | 102484407 B | † | 11/2014 |

(Continued)

OTHER PUBLICATIONS

American National Standard for sealless rotodynamic pumps for nomenclature, definitions, design, application, operation, and test, p. 1-p. 4, published on 2016.†

*Primary Examiner* — Jose A Gonzalez Quinones
(74) *Attorney, Agent, or Firm* — Quinn IP Law

(57) ABSTRACT

A canned motor device includes a fixed seat, a motor unit, and a heat-dissipation cover. The heat-dissipation cover is mounted to the fixed seat and has an inner surface facing and positioned relative to the fixed seat, an outer surface opposite to the inner surface, a protrusion opposite to the inner surface, a mounting groove indenting from the inner surface and having a large-diameter section and a small-diameter section, and a plurality of heat-dissipation fins protruding from the outer surface and surrounding the protrusion. A case body of the motor unit is partially sleeved to a large-diameter section, and a closed end of the cylindrical portion is sleeved to the small-diameter section.

4 Claims, 3 Drawing Sheets

(56) References Cited

U.S. PATENT DOCUMENTS

| | | | |
|---|---|---|---|
| 2008/0080975 A1* | 4/2008 | Fujii | F04D 29/242 415/203 |
| 2009/0060761 A1* | 3/2009 | Winterhalder | H02K 29/08 417/410.1 |
| 2013/0108488 A1* | 5/2013 | Chien | F04D 13/026 417/423.7 |
| 2013/0115118 A1* | 5/2013 | Chien | F04D 13/0626 417/420 |
| 2015/0052934 A1* | 2/2015 | Aso | F04D 13/064 62/467 |
| 2017/0058915 A1* | 3/2017 | Liang | F04D 13/0626 |

FOREIGN PATENT DOCUMENTS

| | | | |
|---|---|---|---|
| CN | 103075350 B | † | 5/2015 |
| EP | 2940308 A1 | † | 11/2015 |
| TW | I441984 B | | 6/2014 |

\* cited by examiner
† cited by third party

CANNED MOTOR DEVICE

CROSS-REFERENCE TO RELATED APPLICATION

This application claims priority of Taiwanese Patent Application No. 107146207, filed on Dec. 20, 2018.

FIELD

The disclosure relates to a motor device, and more particularly to a canned motor device.

BACKGROUND

A conventional canned motor device disclosed in Taiwanese Patent No. 1441984 includes a front cover, an impeller, a cup-shaped rear cover, a stationary shaft and a motor. The motor has a stator, a central motor casing, a motor rear casing and a rotor. The rear cover sleeves the rotor and is formed with an annular groove that indents from an outer surface of a rear end of the rear cover, and a protrusion that protrudes from the outer surface of the rear end and that is surrounded by the annular groove. The motor rear casing is formed with an extending rod at a front end thereof that extends toward the annular groove of the rear cover, and a positioning seat protruding from a rear end thereof. The extending rod is formed with a blind hole that is for the protrusion of the rear cover to fittingly extend thereinto.

While the protrusion and the annular groove of the rear cover and the extending rod and the positioning seat of the motor rear casing provide the conventional canned motor device better stability and positioning, these structures are relatively complicated to manufacture.

SUMMARY

Therefore, an object of the disclosure is to provide a canned motor device that can alleviate the drawback of the prior art.

According to the disclosure, the canned motor device includes a tubular fixed seat extending along an axis, a motor unit mounted in the fixed seat, and a heat-dissipation cover mounted to the fixed seat.

The motor unit includes a case body, a stator and a rotor. The case body has a hollow cylindrical portion and a flange portion. The cylindrical portion extends along and surrounds the axis to define a mounting space therein, and is formed with an open end and a closed end. The closed end has an inner extending portion that extends toward the open end, an outer extending portion that extends away from the open end, and a shaft hole that extends from the inner extending portion to the outer extending portion and that is spatially communicated to the mounting space. The flange portion is connected to the open end of the cylindrical portion and is perpendicular to the axis. The stator is sleeved around the case body. The rotor is mounted in the cylindrical portion of the case body and has a rotor shaft mounted to the shaft hole.

The heat-dissipation cover is mounted to the fixed seat and has an inner surface facing and positioned relative to the fixed seat, an outer surface opposite to the inner surface, a protrusion opposite to the inner surface, a mounting groove indenting from the inner surface, and a plurality of heat-dissipation fins protruding from the outer surface and surrounding the protrusion. The mounting groove is for sleeving a portion of the case body of the motor unit, and has a large-diameter section that is proximate to the inner surface and a small-diameter section that extends along the axis from the large-diameter section away from the inner surface. The cylindrical portion of the case body of the motor unit is partially sleeved to the large-diameter section of the mounting groove, and the outer extending portion of the closed end of the cylindrical portion is sleeved to the small-diameter section of the mounting groove.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
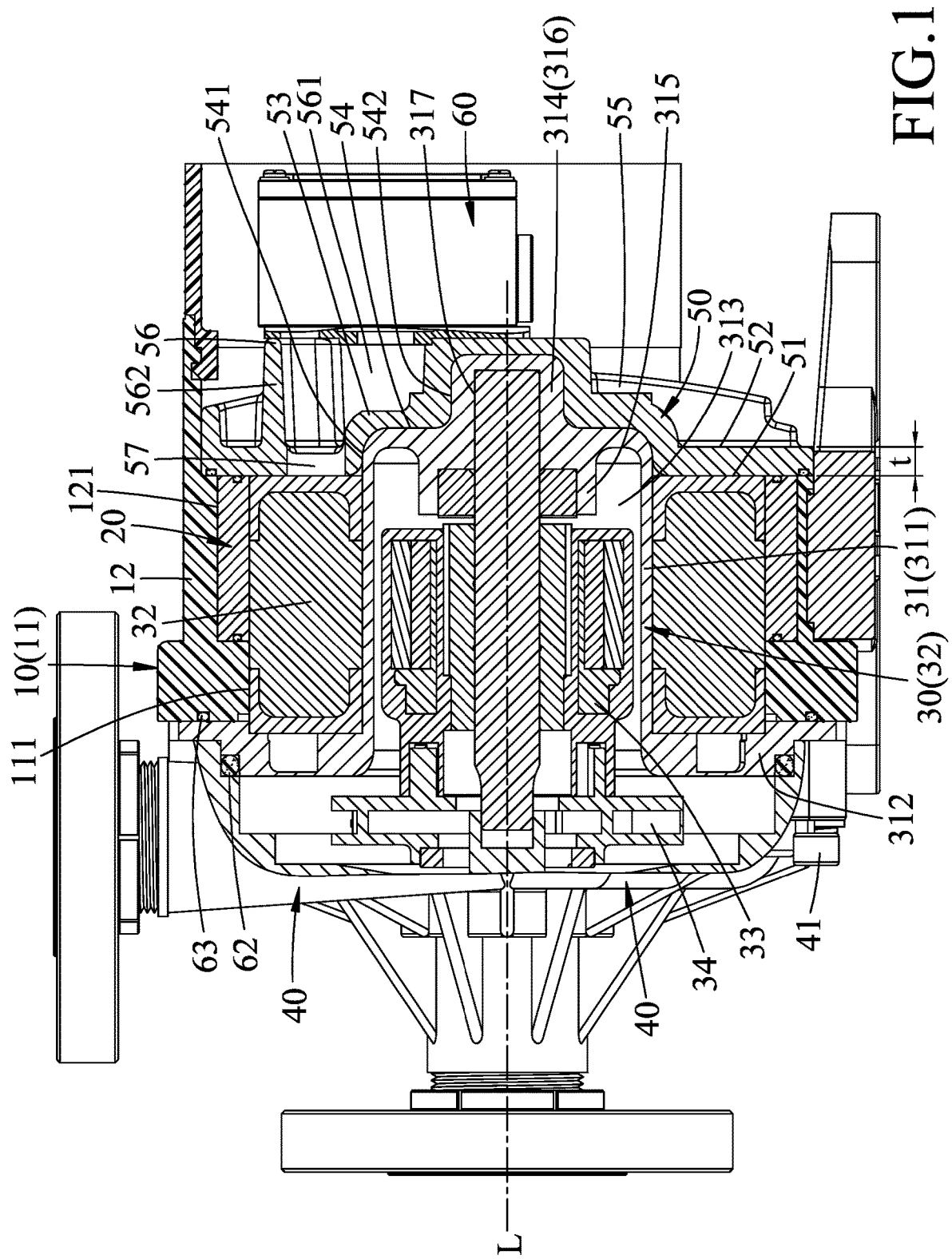
FIG. 1 is a sectional view of an embodiment of a canned motor device according to the disclosure.

Referring to FIG. 1, an embodiment of a canned motor device according to the disclosure includes a base 10, a fixed seat 20, a motor unit 30, a front cover 40, and a heat-dissipation cover 50. In this embodiment, the canned motor device is a canned magnetic pump.

The base 10 is made of a plastic material, preferably an acid and base resistant plastic material such as polypropylene (PP), glass fiber reinforced polypropylene (GFRPP), polyvinylidene difluoride (PVDF), or glass fiber reinforced ethylene tetrafluoroethylene (CFRETFE). The base 10 has an annular base member 11 that surrounds an axis (L) and that defines a through hole 111, and a peripheral cover member 12 that extends from the base member 11 along the axis (L). The base member 11 and the peripheral cover member 12 cooperatively define a linking hole 121 that is spatially communicated to the through hole 111 and that has a diameter larger than that of the through hole 111.

The fixed seat 20 is made of a metallic material, is tubular, and is mounted in the linking hole 121 of the base 10. Specifically, the fixed seat 20 abuts against one side of the base member 11.

The motor unit 30 is mounted in the fixed seat 20, and includes a case body 31 that is mounted to the fixed seat 20, a stator 32 that is sleeved around the case body 31, a rotor 33 that is mounted in the case body 31, and an impeller 34. The case body 31 has a hollow cylindrical portion 311 that is for the rotor 33 to be mounted thereto, and a flange portion 312 that is connected to an open end of the cylindrical portion 311 and that is perpendicular to the axis (L). The flange portion 312 abuts against the other side of the base member 11 opposite to the fixed seat 20. The cylindrical portion 311 extends along and surrounds the axis (L) to define a mounting space 313 therein, and is formed with the open end and a closed end 314. The close end 314 has an inner extending portion 315 that extends toward the open end, an outer extending portion 316 that extends away from the open end, and a shaft hole 317 that extends from the inner extending portion 315 to the outer extending portion 316 and that is spatially communicated to the mounting space 313. The rotor 33 has a rotor shaft 331 mounted to the shaft hole 317. The impeller 34 is connected to one end of the rotor 33 proximate to the open end of the cylindrical portion 31.

The front cover 40 is fixedly mounted to the base 10 via a plurality of screws 41 (only one is shown) and covers the impeller 34. The front cover 40 is for positioning of the impeller 34 along the axis (L) and for supporting the rotor shaft 331. The flange portion 312 is clamped between the base member 11 and the front cover 40.

Figure 2:
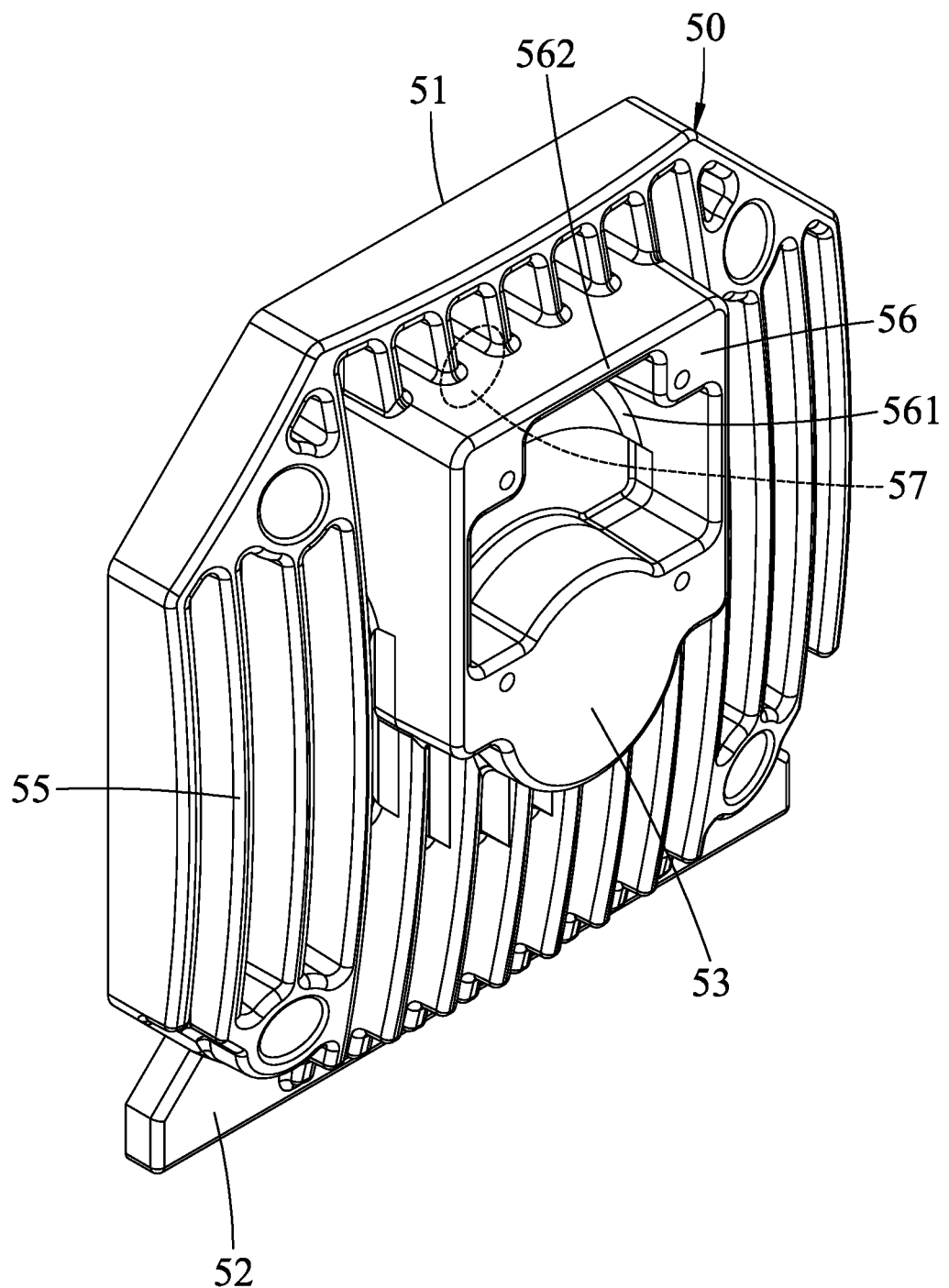
FIG. 2 is a perspective view of a heat-dissipation cover of the embodiment.
Figure 3:
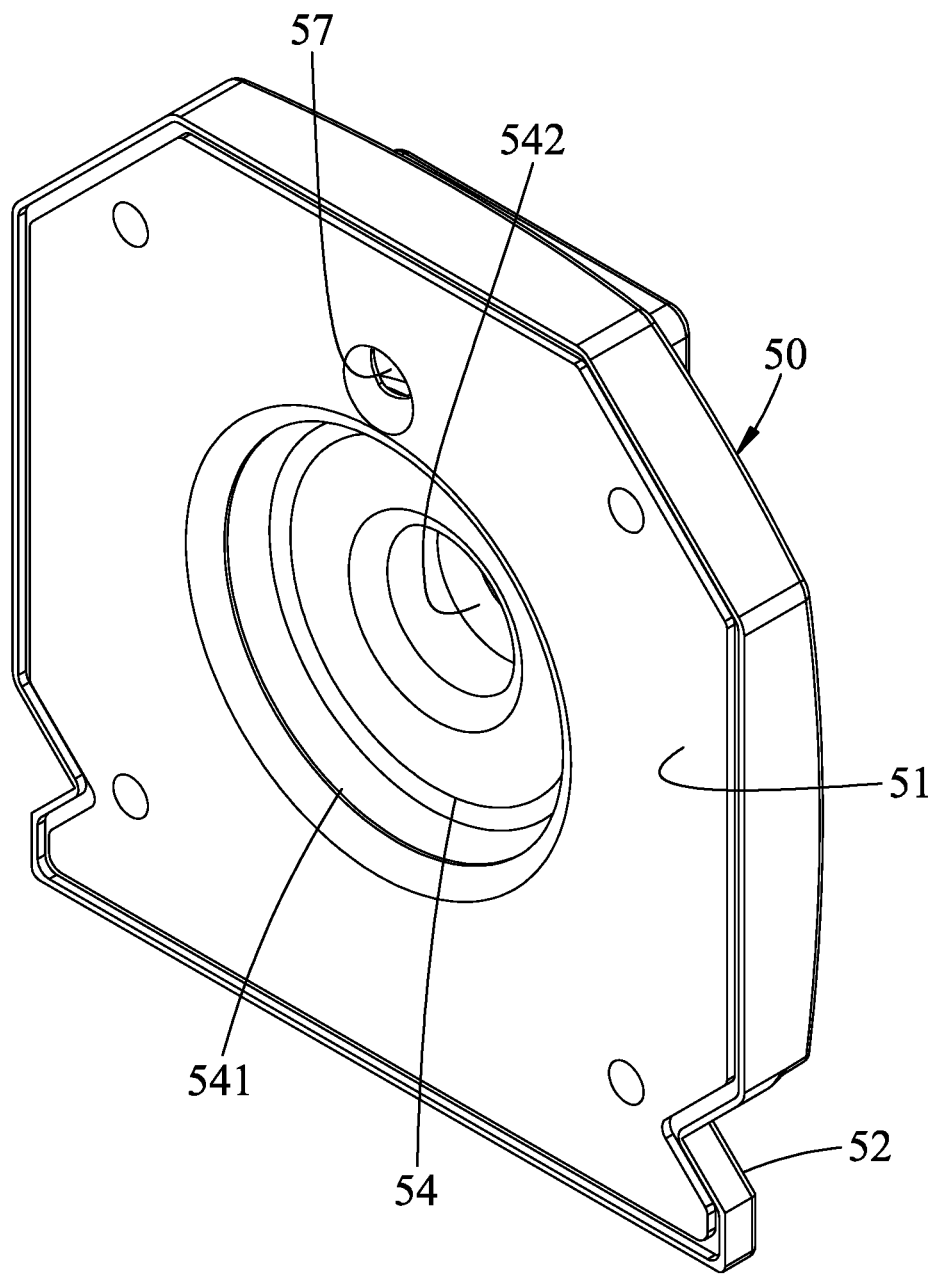
FIG. 3 is another perspective view of the heat-dissipation cover of the embodiment.

Referring to FIGS. 2 and 3, the heat-dissipation cover 50 is mounted to the fixed seat 20, is surrounded by the peripheral cover member 12 of the base 10, and is for positioning of the fixed seat 20 and the motor unit 30 along the axis (L) relative to the base 10. The heat-dissipation cover 50 has an inner surface 51 facing and positioned relative to the fixed seat 20, an outer surface 52 opposite to the inner surface 51, a protrusion 53 protruding from the outer surface 52 along the axis (L), a mounting groove 54 indenting from the inner surface 51 along the axis (L), and a plurality of heat-dissipation fins 55 protruding from the outer surface 52 and surrounding the protrusion 53. The mounting groove 54 is for sleeving a portion of the case body 31 of the motor unit 30, and has a large-diameter section 541 that is proximate to the inner surface 51 and a small-diameter section 542 that extends along the axis (L) from the large-diameter section 541 away from the inner surface 51. The large-diameter section 541 has a depth along the axis (L) that is larger than a thickness (t) between the inner and outer surfaces 51, 52, and the small-diameter section 542 has a depth along the axis (L) that is larger than the depth of the large-diameter section 541. In one embodiment, the large-diameter section 541 has a diameter substantially identical to that of the cylindrical portion 311 of the case body 31.

The cylindrical portion 311 of the case body 31 of the motor unit 30 is partially sleeved to the large-diameter section 541, and the outer extending portion 316 of the closed end 314 of the cylindrical portion 311 is sleeved to the small-diameter section 542. The heat-dissipation cover 50 further has a mounting seat 56 and a wire hole 57. The mounting seat 56 is for a junction box 60 to be mounted thereon, protrudes from the outer surface 52, is disposed on a side of the protrusion 53, and is formed with a surrounding wall 562 defining a counterbore 561. The wire hole 57 extends from the inner surface 51 toward the mounting seat 56 and is spatially communicated to the counterbore 561.

Referring back to FIG. 1, when the canned motor device is fully assembled, the motor unit 30 would be steadily supported by the front cover 40 and the heat-dissipation cover 50. The design of the depths of the larger-diameter and small-diameter sections 541, 542 maximizes contact area between the case body 31 and the heat-dissipation cover 50 and ensures that the mounting groove 54 has enough depth to thoroughly sleeve the closed end 314 and the outer extending portion 316 thereof, thereby improving the thermal stability of and reducing noise of the motor unit 30.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A canned motor device comprising:
    a tubular fixed seat extending along an axis (L);
    a motor unit mounted in said fixed seat and including
        a case body that has
            a hollow cylindrical portion extending along and surrounding the axis to define a mounting space therein, and formed with an open end and a closed end, said closed end having an inner extending portion that extends toward said open end, an outer extending portion that extends away from said open end, and a shaft hole that extends from said inner extending portion to said outer extending portion and that is spatially communicated to said mounting space, and
            a flange portion connected to said open end of said cylindrical portion and being perpendicular to the axis (L),
        a stator that is sleeved around said case body, and
        a rotor that is mounted in said cylindrical portion of said case body and that has a rotor shaft mounted to said shaft hole; and
    a heat-dissipation cover mounted to said fixed seat and having
        an inner surface facing and positioned relative to said fixed seat,
        an outer surface opposite to said inner surface,
        a protrusion protruding from said outer surface along the axis (L),
        a mounting groove indenting from said inner surface along the axis (L) for sleeving a portion of said case body of said motor unit, said mounting groove having a large-diameter section that is proximate to said inner surface and a small-diameter section that extends along the axis (L) from said large-diameter section away from said inner surface, and
        a plurality of heat-dissipation fins protruding from said outer surface and surrounding said protrusion;
    wherein, said cylindrical portion of said case body of said motor unit is partially sleeved to said large-diameter section of said mounting groove, and said outer extending portion of said closed end of said cylindrical portion is sleeved to said small-diameter section of said mounting groove.

2. The canned motor device as claimed in claim 1; wherein:
    said heat-dissipation cover further has
        a mounting seat that protrudes from said outer surface, that is disposed on a side of said protrusion, and that is formed with a surrounding wall defining a counterbore, and
        a wire hole that extends from said inner surface toward said mounting seat and that is spatially communicated to said counterbore; and said canned motor device further comprises a junction box that is mounted to said mounting seat.

3. The canned motor device as claimed in claim 1, wherein said large-diameter section of said mounting groove of said heat-dissipation cover has a depth along the axis (L) that is larger than a thickness (t) between said inner and outer surfaces of said heat-dissipation cover.

4. The canned motor device as claimed in claim 3, wherein said small-diameter section of said mounting groove of said heat-dissipation cover has a depth along the axis (L) that is larger than the depth of said large-diameter section.

\* \* \* \* \*